US007463983B1

(12) United States Patent
Patrick

(10) Patent No.: US 7,463,983 B1
(45) Date of Patent: Dec. 9, 2008

(54) TOF WITH CLOCK PHASE TO TIME BIN DISTRIBUTION

(75) Inventor: David G. Patrick, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 61 days.

(21) Appl. No.: 11/807,015

(22) Filed: May 25, 2007

(51) Int. Cl.
*G01N 31/00* (2006.01)

(52) U.S. Cl. ........................................................ 702/28

(58) Field of Classification Search .................... 702/28
See application file for complete search history.

(56) References Cited

U.S. PATENT DOCUMENTS

| | | | | |
|---|---|---|---|---|
| 4,472,631 | A * | 9/1984 | Enke et al. | 250/281 |
| 5,995,989 | A | 11/1999 | Gedcke et al. | |
| 6,028,543 | A | 2/2000 | Gedcke et al. | |
| 6,094,627 | A | 7/2000 | Peck et al. | |
| 6,647,347 | B1 | 11/2003 | Roushall et al. | |
| 6,744,044 | B2 | 6/2004 | Hidalgo et al. | |
| 6,822,227 | B1 | 11/2004 | Hidalgo et al. | |
| 6,831,280 | B2 | 12/2004 | Scherer | |
| 6,878,931 | B1 | 4/2005 | Roushall et al. | |
| 7,084,395 | B2 | 8/2006 | Fuhrer et al. | |
| 7,129,480 | B2 | 10/2006 | Roushall et al. | |
| 2004/0079877 | A1 | 4/2004 | Hidalgo et al. | |
| 2008/0040050 | A1 * | 2/2008 | Hidalgo et al. | 702/27 |

* cited by examiner

*Primary Examiner*—Bryan Bui
*Assistant Examiner*—Aditya S Bhat
(74) *Attorney, Agent, or Firm*—David E. Allred; Charles B. Katz

(57) ABSTRACT

A TOF mass spectrometer has a clock phase to time bin cycling device that distributes data among storage cells in a random or systematic pattern that cancels out errors due to binary clock path and/or binary signal line irregularities. Data for peaks acquired from plural shots during TOF analysis are distributed among plural binary clock paths and the storage cells such that errors from irregularities in the binary clock paths and/or binary signal lines are not predominant in any peak of a spectrum generated from the analysis.

6 Claims, 6 Drawing Sheets

| | EVENTS DETECTED 1 | 2 | 3 | 4 |
|---|---|---|---|---|
| SHOTS | a | b | c | d |
| | a | b | c | d |
| | a | b | c | d |
| | | | ⋮ | |
| | a | b | c | d |

| | EVENTS DETECTED 1 | 2 | 3 | 4 |
|---|---|---|---|---|
| SHOTS | a | b | c | d |
| | b | c | d | a |
| | c | d | a | b |
| | d | a | b | c |
| | a | b | c | d |
| | | ⋮ | | |
| | d | a | b | c |

TOF WITH CLOCK PHASE TO TIME BIN DISTRIBUTION

FIELD OF THE INVENTION

The present invention relates generally to time of flight data acquisition, and more specifically to devices and methods for improving accuracy of a detected spectrum by correcting binary clock signal errors.

BACKGROUND OF THE INVENTION

U.S. Pat. Nos. 6,647,347, 6,878,931, and 7,129,480, issued to Roushall, assigned to Agilent Technologies, Inc., use a method of reducing noise that includes shifting the phase of an accumulation clock relative to a phase of a sampling clock. In this way, data acquisition is made to occur at an intermediate point of the clock period where ambiguities of signal values are avoided. In one embodiment, an additional accumulator path, which is also phase shifted, is included.

U.S. Pat. No. 7,084,395 to Fuhrer et al., and assigned to Ionwerks, Inc., discloses a time offset between ion generation and ion extraction. Fuhrer provides these time offsets between previous and subsequent runs. The spectrum is then reconstructed.

U.S. Pat. No. 6,831,280 to Scherer teaches synchronization of two signals for error correction.

U.S. Pat. No. 6,094,627 to Peck et al., U.S. Pat. No. 5,995,989 to Gedcke et al., and U.S. Pat. No. 6,028,543 also to Gedcke et al., each assigned to PerkinElmer Instruments, Inc. or related company EG&G Instruments, Inc., have digital signal averaging capabilities that can be implemented with an analogue to digital converter.

U.S. Pat. Nos. 6,822,227 and 6,744,044, and U.S. Patent Application No. 2004/0079877 all issued to Hidalgo, assigned to Agilent Technologies, Inc., disclose the general state of the art.

Improved accuracy in spectra has been obtained by increasing the number of shots taken of a sample in time of flight (TOF) instruments. In a digital approach, increased accuracy has been achieved by taking a large number of shots with a reduced number of ions being detected per shot. Then the data from the shots is summed to obtain a spectrum. This method may be implemented with a time to digital converter (TDC) device that substantially counts individual ions.

As used herein the term “sampling period” refers to the time during which a sampling or a sample of the data is taken. The sampling speed determines the period during which the sample data is collected. The term sample in this context is not to be confused with a sample of the type that comprises the compounds or materials to be analyzed in a mass spectrometer, for example. Rather, sample in accordance with the definition set forth in this paragraph and as predominantly used herein refers to the data or the signal representing that data as it is acquired in a single fundamental period of detection. This fundamental period of detection is the sampling period, and is the predetermined increment of time over which ions will be detected and their time values sent to the temporary storage or buffer without repetition.

As the number of ions per shot and per sample within each shot is further reduced, the physical limits of clocks are approached. This is because in order to further reduce the number of ions per sampling period, the sampling period is reduced. As a result, error is introduced due to the binary clock signal irregularities. Therefore, a device for correcting errors due to these irregularities is needed.

SUMMARY

The number of ions per shot and samples within the shot can be reduced to a point at which counting individual ions is required. Counting individual ions requires clock speeds that are measurable in a range on the order of one to ten nanoseconds, which pushes the physical limits of one or more binary clocks within a high speed master clock. The binary clocks have binary signal paths and there are also binary signal lines between the master clock and a decoder. The binary clock paths and binary signal lines may have irregularities that induce undesirable delays in the real time lapse during transfer of the binary signals over the binary clock paths and signal lines. In fact, transporting the binary signals along a variety of binary clock paths may result in elapses of a respective variety of times due to irregularities. That is, it may take a different amount of time for binary signals to travel the different binary clock paths to the decoder. The binary clock paths themselves and the binary clock paths in combination with the lengths and any irregularities in the binary clock paths and binary signal lines become significantly unique at high data acquisition rates. The binary signals in the plural binary clocks form a composite binary signal within the master clock. The composite binary signal is decoded or combined by the decoder. This decoding may include combinatorial summing of the binary signals or the composite binary signal. It is to be understood that all the binary signals from all the respective binary clocks in the master clock form part of the composite binary signal, and all of the composite binary signal is decoded for each of typically plural samples taken during each shot. The decoder provides a resultant time stamp for each sample and passes the time stamp and possibly a value for a detected event into storage cells. The storage cells include one or more of temporary storage buffers and permanent memory time bins.

If plural shots are taken without distributing the data from the samples within those shots among the binary clocks in a non-repeating manner relative to peaks of the spectrum, then errors may be perpetuated or increased by a natural pattern of acquisition and storage of the data in the storage cells. That is, one or more binary clock path and binary signal line participating in the generation of a composite binary signal to be decoded may have irregularities that increase or decrease the time it takes for the data to travel to the decoder relative to the expected time lapse, and thus affect the values stored. If a peak corresponds to a time range that repeatedly sends data signals along the same binary clock paths resulting in the same or similar composite binary signal being sent to the decoder, then the peak values will be increased, decreased, or skewed to a degree commensurate with the irregularities in the clock paths and the number of shots in which that peak is represented by the data signals during acquisition. Perpetuation of errors can be reduced by distributing the data in a systematic way so that data pertaining to each peak is distributed over a variety of combinations of the binary clock paths and/or binary signal lines such that any errors due to the binary clock path/signal line combination irregularities is statistically cancelled out. Transport of the data can be distributed by adding a pattern of delays that change the clock phases artificially such that a pattern of composite binary signals is transmitted for each peak. This also means that plural like signals can be distributed via a variety of clock paths in a statistically cancelling pattern over a number of shots.

In a simple form, embodiments of the present invention include a TOF mass spectrometer with a clock phase to time bin cycling device. The TOF mass spectrometer includes a time of flight analyzer with an ion source connected to the time of flight analyzer. An ion detector is associated with the time of flight analyzer. The TOF mass spectrometer also includes at least one data storage cell for storing data representing a time stamp. The TOF mass spectrometer has a high speed master clock with a plurality of binary clocks. The binary clocks have respective binary clock paths. A combination of the binary clock paths carries a composite binary signal to be decoded into the time stamp and sent to the at least one data storage cell. The TOF mass spectrometer also includes binary clock path selection device that systematically selects the combination of the binary clock paths in a pattern that directs data signals representing particular masses generally uniformly along the plurality of binary clock paths.

In one embodiment, the clock path selection device has a variable delay timer operably connected to one of the ion detector and the ion extractor for adjusting a delay for transporting the data to the data storage cell(s) in a systematic manner. Thus, a sample or data for a first peak will be delivered via different binary clock paths or via different composite binary signals over a plurality of shots during analysis, for example. Likewise, the variable delay timer adjusts delays in transporting data to the storage cell(s) for a plurality of peaks such that the data representing a particular peak is transported in different ways or as a plurality of different composite binary signals. In this way, aberrations in the data caused by irregularities in a particular binary clock path are distributed in a spectrum for statistical improvement of the spectrum.

In another simple form, embodiments of the present invention include a method of reducing errors in a time of flight (TOF) spectrum. The method includes analyzing a plurality of shots, (for a sample compound for example), in a time of flight mass spectrometer. One step of the method includes creating a pattern of delays for data signals received from a detector of the time of flight mass spectrometer into a high speed clock. Another step of the method is adding different delays of the pattern of delays to the data signals to vary a combination of binary signals within the high speed clock. The steps of the method include forming a pattern of composite binary signals by combining a plurality of binary signals in the high speed clock for each data signal. The method includes triggering passage of the composite binary signals into a decoder by the high speed clock. In accordance with the method, the binary signals for a particular peak are made up of a plurality of different composite binary signals. The different ones of composite binary signals have different combinations of the plurality of binary signals based on a distribution of the pattern of delays. The method also includes decoding the composite binary signals to obtain time stamps, and placing the time stamps into data storage cells.

The foregoing and other features and advantages of the present invention will be apparent from the following more detailed description of the particular embodiments of the invention, as illustrated in the accompanying drawings.

BRIEF DESCRIPTION OF THE DRAWINGS

Like reference numerals refer to corresponding parts throughout the several views of the drawings.

DETAILED DESCRIPTION OF EMBODIMENTS

Figures 1, 5, 6:
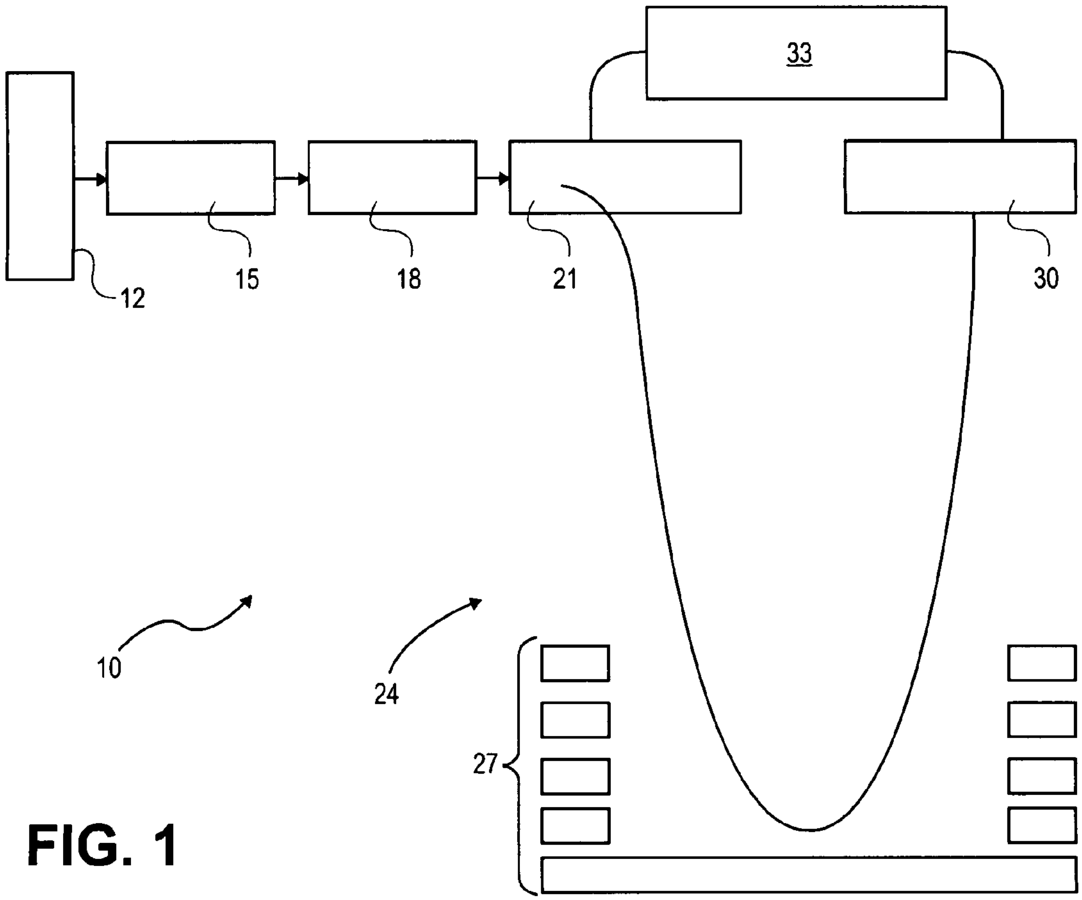
FIG. 1 is a diagrammatic view of a TOF mass spectrometer in accordance with embodiments of the present invention.
FIG. 5 is a diagrammatic table showing an example of clock phases or paths corresponding to samples within a plurality of shots without clock phase to time bin cycling.
FIG. 6 is a diagrammatic table of clock phases or paths corresponding to samples within a plurality of shots with an example of clock phase to time bin cycling applied.

FIG. 1 is a diagrammatic view of a TOF mass spectrometer 10 having an ionization chamber 12, a deflector 15, a lens 18, and an extraction chamber 21. A TOF analyzer 24 has a flight tube that provides a free path for extracted ions from the extraction chamber 21 into a reflector 27, which sends the ions into a detector 30. A clock phase to time bin cycling device 33 in accordance with embodiments of the present invention is connected to the detector 30 and the extraction chamber 21.

In a digital application of fast data acquisition a time to digital converter (TDC) may be incorporated and data may be acquired at a rate on the order of approximately one datum per one to ten nanoseconds, for example. Speeds of a datum per approximately 250 picoseconds or faster can also be achieved. Embodiments of the present invention are applicable at acquisition rates that are faster and slower than these rates without limitation. However, at these rates, the amount of sample being ionized and the number of ions being extracted are greatly reduced so that substantially all of the ions are counted. It is to be understood that the number of ions being extracted can be adjusted such that not more than approximately one ion per temporary storage or buffer cell will arrive during each sample period. For example, if there are eight buffer cells, then the number of ions extracted may be restricted to be less than or equal to approximately eight. In this way substantially every ion is detected and data representing substantially each ion is acquired and stored.

At slightly reduced sampling speeds or increased ion rates as compared with the fastest possible speeds, an analogue to digital converter (ADC) can count a number of ions within a sample period. These sampling speeds are still higher than that which is normally practiced with ADC devices. However, these slightly decreased sampling speeds and increased ion rates may be achieved by calibrating the detected voltage ranges in order to assign statistically probable counts of individual ions detected within the sample period. Similar to the disclosure regarding TDC devices, any sample or corresponding time stamp assigned to an ion count would be subject to binary counting irregularities that originate in the binary clocks. These irregularities can be statistically corrected together with the binary clock correction described herein.

Figure 2:
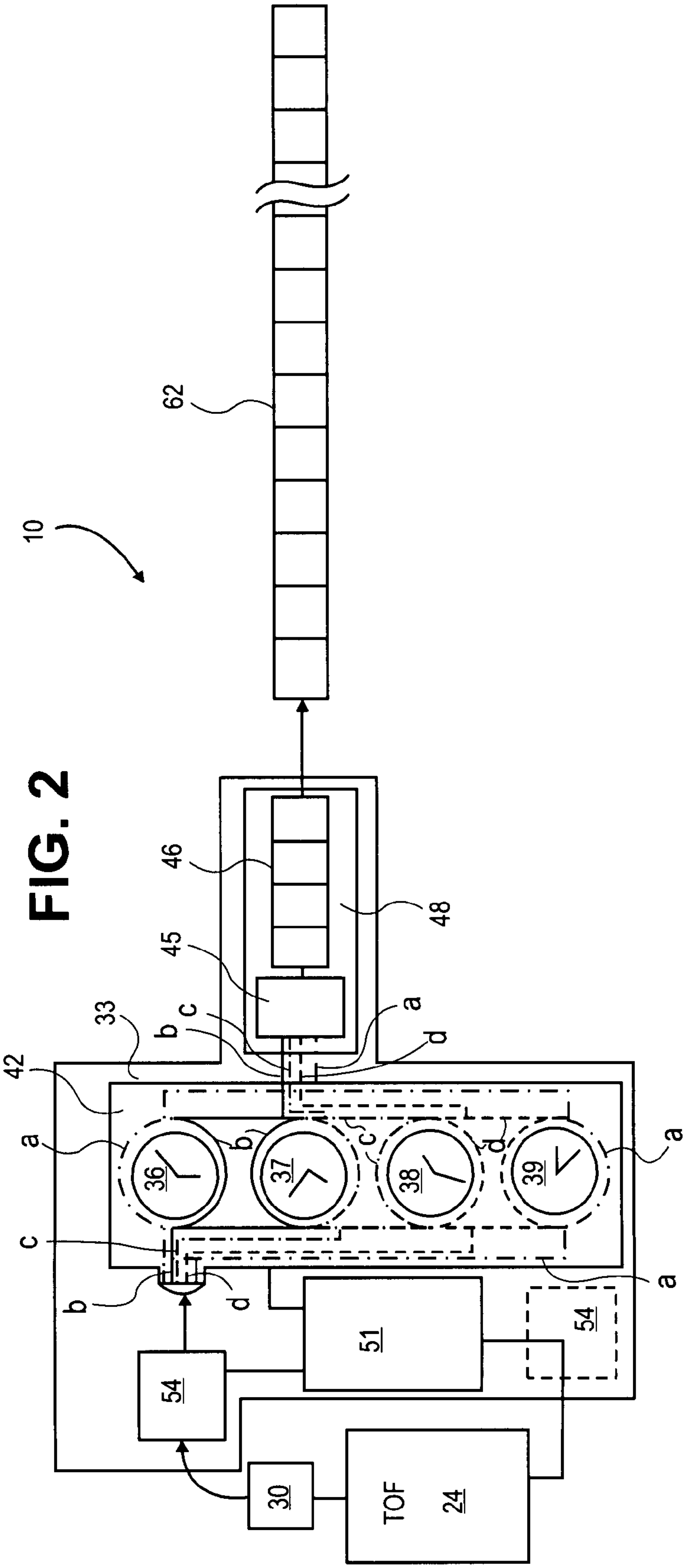
FIG. 2 is a schematic view of the TOF mass spectrometer and a clock phase to time bin cycling device.

FIG. 2 is a schematic representation of the clock phase to time bin cycling device 33 with its components in relation to the TOF mass spectrometer 10. In particular, the components of the clock phase to time bin cycling device 33 are shown surrounded by an enclosing outline. The clock phase to time bin cycling device 33 includes a plurality of binary clocks 36, 37, 38, 39 forming a high speed master clock 42, a decoder 45 for receiving binary signals from binary clock paths within the master clock 42, and one or more of temporary storage or buffer cells 46. The decoder 45 and the one or more buffer cells 46 make up a single acquisition unit 48 for decoding the binary signals into a time stamp, temporarily storing the time stamp, and sending it to a permanent memory array 62. The clock phase to time bin cycling device also includes a controller 51 and a variable delay timer 54. The high speed master clock 42 with its binary clocks 36, 37, 38, 39 is connected to the detector 30 of the mass spectrometer 10 and to the one or more buffer cells 46. Thus, the master clock 42 with its binary clocks 36, 37, 38, 39 can deliver binary signals representing a time stamp and/or a value for the ions detected in the detector 30 to the one or more buffer cells 46.

During acquisition the permanent memory array 62 functions as a single accumulator that reads newly arrived time stamps contained in the temporary storage or buffer cells 46, and then modifies the contents of its own storage cells by combining the contents with the newly arrived time stamps in an additive manner. The modified values are then written back into the permanent memory array 62. The modified values are written back into appropriate time bins of the permanent memory array that correspond to specific times and mass values.

The high speed master clock includes a plurality of binary signal lines forming binary clock paths among the binary clocks 36, 37, 38, 39. The combination of the binary signals of all the binary signal lines within the high speed master clock 42 is the basis for the time stamp. That is, some of the binary signals may be high and others may be low after a triggering rising edge or falling edge of one or the binary clocks. The combination of lows and highs can then be decoded in the decoder 45 to provide the time stamp to be sent on to the one or more buffer cells 46.

The controller 51 may be an electronic controller such as a computer of the PC type, an embedded processor, or programmable hardware device, or some other equivalent or superior device capable of electronic manipulation and processing of data in accordance with a software and/or another logical control system and/or user input. For example, such programmable hardware devices may include one or more of a field-programmable gate array (FPGA) or application-specific integrated circuit (ASIC). The variable delay timer 54 is shown connected to the controller 51, the detector 30 and the master clock 42 between the detector 30 and the master clock 42. An alternative position for the variable delay timer 54 is shown in dashed lines on the line connecting the controller to the TOF. In either case, the time stamp and timing of the data signal from the detector or to the extractor may be adjusted under the control of the controller 51. The software or other logical mechanism within the controller 51 can control over which clock path or pattern of clock paths the signals from the detector will be transmitted based on time lapse from extraction to detection and delays. The controller 51 can implement clock path selection in order to provide a uniform or random distribution of transmission of data along the different clock paths and/or into specific time bins of a permanent memory array 62. In practice, once the binary clocks 36, 37, 38, 39 are initiated and synchronized, they will run continuously during analysis and processing of the data. Thus, binary clock paths can be selected by inserting or removing delays. A pattern of binary clock path selection can be implemented by establishing a corresponding pattern of adjusting delays applied by variable delay timer 54 under control of the controller 51, for example.

For example, a first binary clock path "a" is represented by a long dash-dot line that runs through binary clocks 36, 39 of the high speed master clock 42 and into the decoder 45. A second binary clock path "b" is represented by a solid line that runs through the binary clocks 36, 37 of the high speed master clock 42 and into the decoder 45. A third binary clock path "c" is represented by a double-dashed-dot line that runs through the binary clocks 37, 38 of the master clock 42 and into the decoder 45. A fourth binary clock path "d" is represented by a simple single dashed line that runs through the binary clocks 38, 39 of the master clock 42 and into the decoder 45. These binary clock paths "a", "b", "c", "d" show simple binary signal line combinations that are analogous to the typically more complex combination of binary signal line combinations over with the binary signals will be transmitted. For example, each of binary clock paths "a", "b", "c", and "d" is shown with two branches or binary signal lines represent physical paths of binary signals that register high carrying time stamp information and/or other values associated with ions detected in the detector 30. In reality each transmission includes a clock path made up of a combination of all the signals carried on all of the binary signal lines. Some of these constituent signals will be high and register a "one", while other will be low and register a "zero". The combination of all the signals for a transmission may be termed a composite signal. The composite signal can then be decoded in the decoder 45 for a time stamp and possibly a value for a magnitude or number of ions detected.

The binary signal lines or physical paths transmit signals having a combination of high and low values that translate into a time stamp. The combination of the signals or the composite signal is a combinatorial summation of binary signals through one or more of the binary clocks 36, 37, 38, 39. A time stamp may derive from a complex combination of the binary signals transmitted over two, three, or more binary signal lines corresponding to a particular binary clock path. Combinations of the binary signal lines through multiple binary clocks thus represent different binary clock phases or binary clock paths. The binary clock paths taken as a whole can provide the basis for each of the needed increments in a binary counting mechanism. In this way it can be appreciated that the combination of binary signal lines or combination of binary clock paths will vary for each different composite signal.

Figure 3:
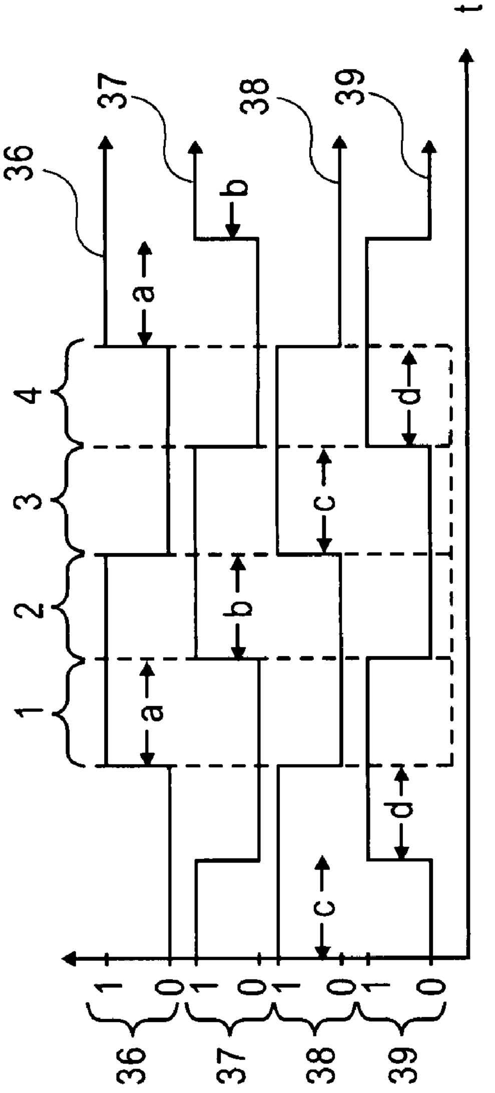
FIG. 3 is a graph of relative values for a plurality of high speed clocks.

FIG. 3 shows an example of graphed relationships of signals transmitted on binary clock paths that match the schematic diagram of the binary clock paths "a", "b", "c", "d" through binary clocks 36, 37, 38, 39 of FIG. 2. For this example, the binary clocks 36, 37, 38, 39 can be synchronized and phase adjusted such that each subsequent clock is ninety degrees out of phase with the previous clock. Thus, a time duration corresponding to binary clock path "a" may be defined as the period when binary clocks 36 and 39 are high. A time duration corresponding to clock path "b" may be defined as the period when clocks 36 and 37 are high. A time duration corresponding to clock path "c" may be defined as the period when clocks 37 and 38 are high. A time duration corresponding to clock path "d" may be defined as the period when clocks 38 and 39 are high. A composite signal of detected events for each of four periods 1, 2, 3, 4 is a summation or combined values of the binary signals through each of the binary clocks 36, 37, 38, 39 and the clock paths "a", "b", "c", "d". These composite signals and the periods are represented by brackets, dashed outlines, and their contents for the four respective periods 1, 2, 3, 4. In the case in which the acquisition rate is adjusted to detect approximately one event per period, the four periods 1, 2, 3, 4 may alternatively represent composite signals of events detected.

In the simple example shown in FIGS. 2-7, the time stamps and/or values being transmitted to the permanent memory array 62 would typically be delivered one by one to the next available of the one or more buffer cells 46. Alternatively, the buffer cells may be tied to respective clock paths. The one or more buffer cells 46 are temporary memory cells that hold the data until it is distributed to specific time bins of the permanent memory array 62. Provision of a temporary buffer in addition to the permanent memory 62 enables multiple shots to be taken in a repeated manner and the data to be transferred from the temporary buffer cells 46 into the permanent memory 62 while a subsequent shot with its included samples is being taken. The permanent memory array 62 may have as many available cells or time bins as a potential number of values to be recorded from a single spectrum. Alternatively, the permanent memory array 62 may have as many available cells or time bins as a potential number of values to be recorded from multiple spectra.

Figure 4:
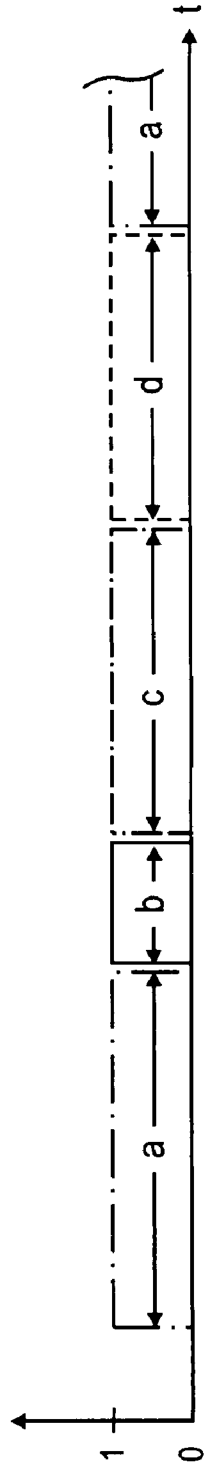
FIG. 4 is a graph of a plurality of clock phases with clock path irregularity effects.

While the steps or periods of the binary clocks 36, 37, 38, 39 in FIG. 3 are shown as uniform steps that would be expected to deliver evenly divided time duration values for the different clock paths, the durations may vary greatly in reality, as shown in FIG. 4. This is especially true for small time increments at which the physical limits of the binary clocks 36, 37, 38, 39 and binary clock paths "a", "b", "c", "d" carrying signals to and from the clocks are being approached. Thus, delays in transmission of the signals over one or more of the binary clock paths "a", "b", "c", "d" may occur and affect the spectrum that is being generated.

Alternatively expressed, as shown in FIG. 4, irregularities in the clock paths "a", "b", "c", "d" can result in uneven clock phases or durations. For example, because of delays in the clock path "a", an event occurring during a second period 2 of FIG. 3, and that would correspond to a second clock path or duration "b" under ideal conditions will actually be detected during a first period 1 corresponding to the first clock path or duration "a". That is, signals representing ions that under ideal conditions would be detected and assigned values in a second period 2 during transmission of binary signals along a second clock path "b" will actually be detected during period 1 when the first clock path "a" is still active. Thus, instead of the ion being detected and a signal representing the ion being delivered along the second clock path "b", (as would occur under ideal conditions with no clock irregularities), the ion will be detected during a first period of detection when clock path "a" is still active. Thus, the signal representing the ion will be delivered along the first clock path "a" and not along the second clock path "b" due to the irregularities. In this example, the effects of this delay is that phase "a" shown in FIG. 4 encroaches on the phase "b", and the detection and recording of events that should have occurred during phase "b" is reduced while the detection and recording of events during "a" is increased. If the buffer cells 46 are limited to receive data for a maximum of one event per sample within a shot, then the data for only one ion may be delivered to the buffer cell even though there are two ions detected in the prolonged duration of binary clock path "a". Alternatively, signals representing time lapses and magnitude values for each of the events occurring during each binary clock path can be delivered to the buffer cells 46. In any case, the values can be delivered over varying clock paths that will, over a number of shots, statistically cancel clock errors.

In the representation of FIG. 4, the phase for binary clock paths "c" and "d" are substantially the same size or duration, and have start times that would substantially correspond to leading edges of the binary clocks 38 and 39, respectively. Thus, binary clock paths "c" and "d" do not contribute to the errors in the spectrum sought. However, with repeated shots and repeated transmission of data for like samples detected during the extended duration of phase "a", into buffer cells corresponding to an early or low mass region of the spectrum for example, an inaccurate weighting will occur. This is shown by the relatively larger areas "a" of the graphical representation shown in the table of FIG. 5.

Figure 7:
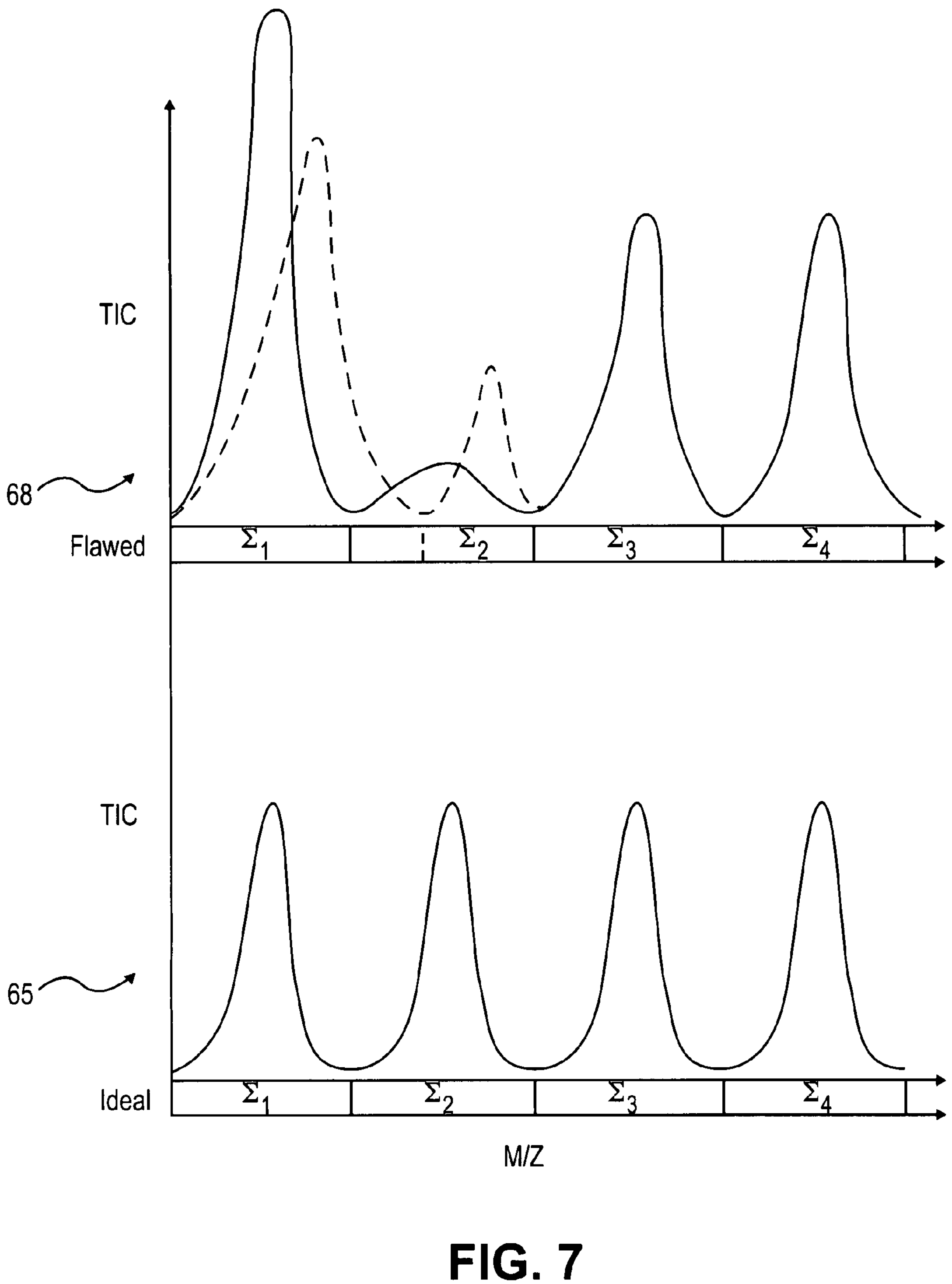
FIG. 7 is a graph showing an example of a flawed spectrum without clock phase cycling to time bin cycling as compared with an ideal spectrum or a spectrum produced by applying clock phase to time bin cycling for error correction for a simple four peak example.

In a simple example for illustrative purposes with regard to FIGS. 5-7, a spectrum has been selected that actually or ideally has four evenly spaced peaks each having substantially the same magnitude. FIGS. 5 and 6 have columns labeled 1, 2, 3, and 4 that represent each of four periods. For the purposes of this example, columns 1, 2, 3, 4 will also represent respective events detected. The events will be single ions detected, and there will be one ion detected for each of the peaks during each shot under ideal conditions with no errors. As such, the column numbers also correspond to regions of the spectrum or ranges of m/z ratios. For this simple example, a deviation from the example model indicates errors, and correction of the errors will result in a spectrum that corresponds to the ideal or actual example spectrum with four evenly spaced peaks having substantially the same magnitude or intensity.

In the table of FIG. 5, column 1 represents data from events that occurred during the first binary clock path or phase "a". The boxes representing the data from path "a" have larger areas than the boxes of each of columns 2 through 4 that represent data transmitted via the other clock paths. The result is that summing the data from the first clock path "a" results in a peak that is taller and further to the right than actual values for the ideal or actual spectrum sought. At the same time, the second column has areas corresponding to clock path "b" that was shortchanged by the delays in clock path "a". Thus, in summing the data from the second column of FIG. 5, the resulting peak will have a lower than actual intensity and a higher than actual m/z. This deviation is due to fewer events being detected during a time corresponding to binary signal transmission along binary clock path "b". The data is also delivered later than it should because of the time delays caused by the clock irregularities in clock path "a".

To avoid propagation of these errors, the clock paths can be controlled in a manner that causes statistical reduction or cancellation of the errors. This may be done by a systematic rotation or other pattern that delivers the data corresponding to each peak along plural binary clock paths. The data may also be systematically distributed along a plurality of different signal lines into a plurality of the buffer cells such that reinforcement of clock path irregularities is avoided. Randomization of binary clock paths may be implemented to achieve the needed distribution and variation of transmission of binary signals along the binary clock paths. Whether by randomization or by a systematic pattern, the data may be distributed substantially evenly or uniformly to statistically cancel errors from clock path irregularities.

FIG. 6 shows a simple repeating pattern in which binary clock path or phase "a" data corresponding to a first sample of a first shot is transmitted along the first binary clock path and delivered into one of the buffer cells 46 for the first shot. Data for phases "b", "c", and "d" corresponding to second, third, and fourth samples is delivered via respective clock paths and into the buffer cells 46 for the second through fourth clock paths “b”, “c”, “d” of the first shot. For a second shot the data is first delivered via clock path “b” into a buffer cell. This may be accomplished by adjusting a time delay applied by the variable delay timer 54 under the control of controller 51. Thus, a first sample or event detected in the second shot will be delivered via the second clock path “b”. The remaining data for second, third and fourth samples or events detected will be sequentially delivered via third, fourth, and first clock paths “c”, “d”, and “a”, respectively. A first sample or event detected in a third shot will be delivered via the third clock path “c”. Once again the second, third, and fourth samples or events detected will be delivered sequentially via fourth, first, and second paths “d”, “a”, and “b” in a continuing rotating order. The pattern of the first sample or event detected for each shot will progress according to the same pattern such that an even distribution of transmission of the data via the clock paths “a”, “b”, “c”, and “d” is achieved. Thus, there will be an even distribution of the effects of clock path irregularities among the data that is decoded and sent to the buffer cells 46 and on to the permanent memory array 62.

In the example of FIG. 6, the simple repeating pattern may be implemented such that data from a first sample or detected event of a first shot is delivered via the first clock path “a” into the first of the buffer cells 46. The data from a second sample or event is delivered via the second clock path “b” into the second of the buffer cells 46, and so forth. However, in reality an ion may not be detected for each peak for each shot. Therefore, in a system that fills the buffer cells according to a first available cell pattern, only two of four buffer cells may be filled by data from samples within a shot, for example. In any case, the binary clock paths and signal lines in general can be rotated or randomized such that data from events or ions corresponding to a particular peak will not be predominantly transmitted along a particular binary clock path or signal line. In this way, proliferation of errors due to clock path irregularities can be avoided. In an alternative embodiment, the controller distributes delivery of data from events or ions detected among respective binary clock paths based on m/z ranges, (or regions of a spectrum.) This distribution of delivery could be caused to follow a pattern or could be randomized in order to statistically cancel binary clock path and other signal path errors in accordance within the teachings of the present invention.

FIG. 7 shows a graph comparing an ideal spectrum 65, (or one that has been corrected in accordance with embodiments of the present invention), with a flawed spectrum 68 that would occur at high data acquisition rates without the clock phase to time bin cycling device and/or method in accordance with embodiments of the present invention. FIG. 7 shows the simple example spectrum described above as having just four peaks for illustrative purposes. The flawed spectrum 68 has relative peak heights and positions corresponding to data that is carried along clock paths “a”, “b”, “c”, “d” that are not selected under control of the controller 51, and where data corresponding to first through fourth sample, (which represent events or detected ions 1, 2, 3, 4), for several shots is delivered via first through fourth clock paths “a”, “b”, “c”, “d” and is placed in the respective buffer cells and sent on to memory cells of the permanent memory array 62 for each sample, within each shot. That is, for the flawed spectrum 68, delivery of the data for each peak is not controllably distributed among different binary clock paths over a plurality of shots. Rather, for the four peak example, delivery of data from four samples or detected events 1, 2, 3, 4 per shot are delivered via clock paths “a”, “b”, “c”, “d” in the same order for each shot, as shown in the graphical representation of the table of FIG. 5. It should be noted that it is highly likely that the data for a particular peak in this simple example will repeatedly be transmitted via the same binary clock path because of the similar m/z values for each peak and the high likelihood of detection of an event for each peak in each of the shots.

Thus, without any control from a controller 51, a high level of repetition of clock paths occurs. This causes a summing of errors due to clock path irregularities when they exist, as has been described. The values of the data representing times are subjected to an appropriate transformation and are stored in appropriate time bins or storage cells of the permanent memory array 62 such that the transformed values represent m/z or some other mass related value. In the example of the clock phases shown in FIG. 5, and the corresponding flawed spectrum 68 of FIG. 7, phase “a” results in a higher peak indicating apparent higher intensities of ions present. The peak from the data of phase “a” would also be positioned further to the right for higher apparent m/z values if it were possible to know the amount of the delays caused by the irregularities. This is shown by the left-most peak that is represented by a dashed line. Likewise, the peak from the data of phase “b” would have a smaller magnitude and be positioned further to the right as indicated by the dashed line peak that is second from the left.

However, since the magnitude of the delays due to irregularities is difficult to determine, in practice the summation of events detected is fitted into equally spaced periods as though there were no time delays. The result of this squishing of larger periods is a much higher than actual value for peak magnitudes as shown by the left-most peak that is indicated by a solid line. The result of stretching of shorter periods is much lower apparent values than actual values for peak magnitudes as indicated by the solid line peak that is second from the left. The squished periods will likely place peaks further to the left than they actually are, and the stretched periods will likely not draw peaks to the left far enough to accurately identify the real or ideal m/z. However, whether these values are skewed left or right depends on where the data is actually detected within each period. Thus, the errors due to binary clock path irregularities may result in peaks that apparently occur earlier of later in time than they actually occur in an ideal or corrected spectrum of the sample. Thus, the m/z values are skewed with respect to reality without the corrections in accordance with embodiments of the present invention. A wide variety of errors and skewed data not represented by the present example form the pool of possibilities. Embodiments of the present invention are considered to be equally applicable to all varieties of errors that arise due to binary clock path and signal line irregularities.

The ideal or corrected spectrum 65 in FIG. 7, on the other hand, has been corrected by distributing the transmission of data signals from the detector of the TOF mass spectrometer 10 substantially evenly among the different binary clock paths or phases “a”, “b”, “c”, “d”. This corresponds to distributing delivery of data from the samples or events detected for each shot among the binary clock paths “a”, “b”, “c”, “d” in accordance with a systematic pattern of rotation as shown in the table of FIG. 6. Other patterns or randomization could be substituted to achieve the same beneficial result without departing from the spirit and scope of the invention. It is also to be understood that the binary clock paths will typically be much more numerous and diverse in their combination of binary signal line combinations than is depicted in the simple examples of FIGS. 2-7. In the present example, the summation of first samples or events detected in each shot is delivered via an evenly distributed plurality of the binary clock paths "a", "b", "c", "d". Likewise, delivery of data from second, third, and fourth events is evenly distributed over the plurality of paths. In reality what the present invention avoids is sending data signals that are flawed due to irregularities in a particular binary clock path to the same time bins in some weighted fashion. For example, errors from the irregularities of clock path "a" are distributed such that they substantially cancel each other out. Data delivered via clock path "b" is also compensated. Thus, the corrected spectrum can be substantially the same as or at least a close approximation of the ideal spectrum 65.

Figure 8:
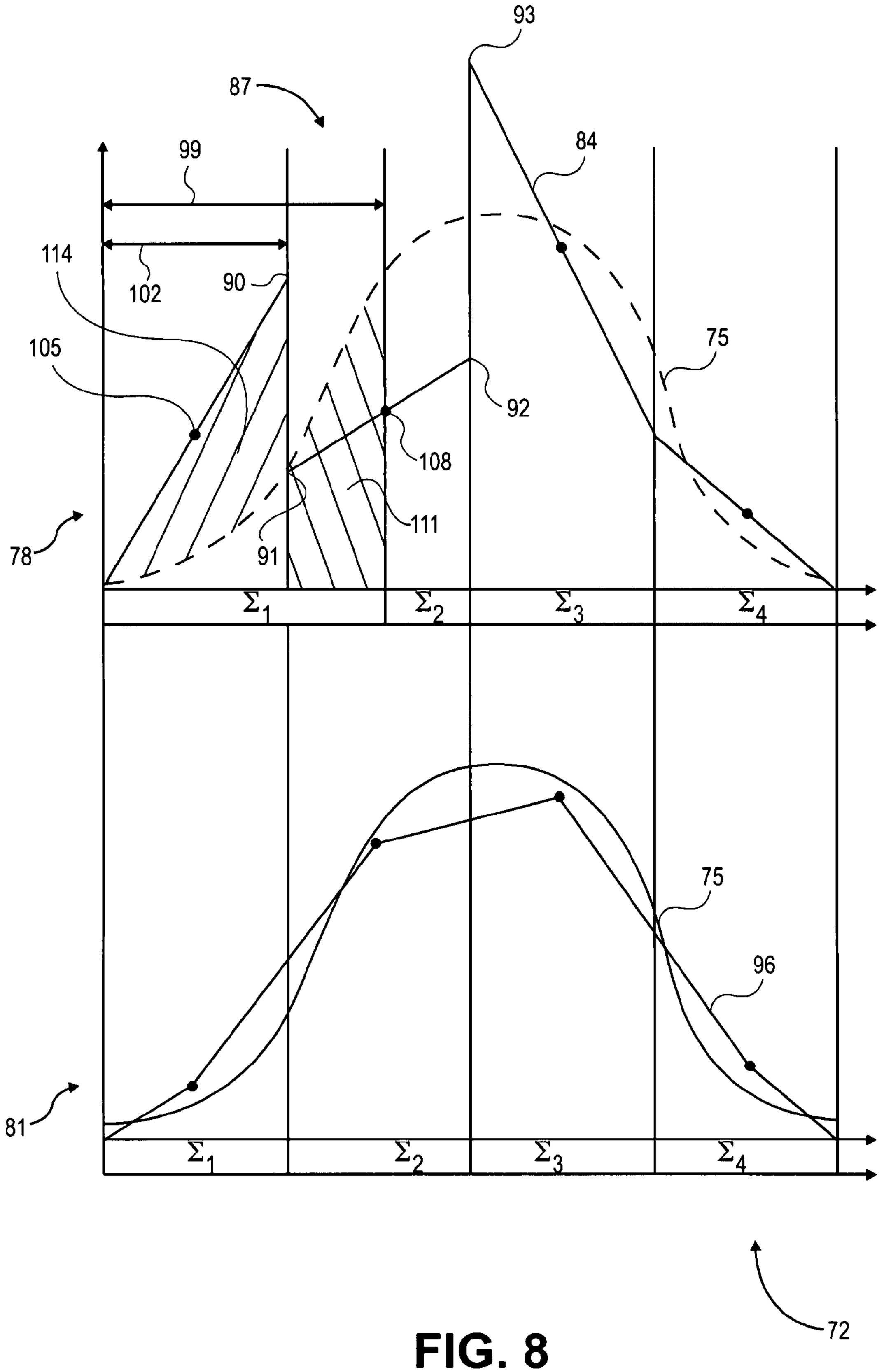
FIG. 8 is a graph showing an example of a flawed spectrum without clock phase to time bin cycling as compared with an ideal spectrum or a spectrum produced by applying clock phase to time bin cycling for error correction on a peak being represented by data from four time bins.

FIG. 8 shows a graph 72 of another simple example of analysis of a sample having only one peak with real or ideal values depicted by the dashed curve 75 in the upper portion 78 and by the solid curve 75 in the lower portion 81. As set forth above, the values sent as signals and manipulated are actually time values. These time values are eventually subjected to a transformation and converted to m/z values. However, it is to be understood that the values shown in the graph 72 of FIG. 8 is representative of either time values or a conversion of the time values to m/z values, even though the relationship is not linear. In any case, the detected spectrum is derived from time data detected during analysis. Therefore, as the limits of the binary clocks are approached and irregularities in the binary clock paths become significant as described above, the detected spectrum becomes flawed. The upper portion 78 of the graph 72 has a flawed spectrum 84 showing an example of a peak fracture 87 with its attendant serious discontinuities at points 90, 91, 92, and 93. The flawed spectrum 84 is an example showing how irregularities in the binary clock paths "a", "b", "c", "d" can cause peak fracture when a single peak is formed by data transmitted along more than one of the binary clock paths per shot. The large magnitudes around a fracture 87 are often relatively large in comparison with the ideal values. Small magnitudes around the fracture 87 are often very small relative to actual or ideal values. Thus, the flawed spectrum 84 cannot accurately approximate the actual or ideal spectrum. Instead of a more accurate fit like that of corrected spectrum 96 shown in the lower portion 81, the flawed spectrum 84 inaccurately gives the appearance of a sample that has two peaks and a rather jagged edge in the range of times or m/z values shown.

The lower portion 81 of the graph 72 of FIG. 8 shows the ideal or real relative values of the spectrum of the sample being analyzed as the solid curve 75. A good approximation can be achieved by one or more of curve fitting techniques that may include averaging and plotting of points based on estimates of areas under a curve, smoothing and other techniques that will result in an approximation that generally matches or follows the real values of the spectrum of the sample. With a resolution maximized to all integer values of m/z values in Daltons per charge, and substantially all ions being counted, the approximated spectrum 96 has a good chance of being very accurate and closely matching the ideal spectrum of solid curve 75. However, it has been found that one source of inaccuracies at these high rates of acquisition is from the introduction of errors due to binary clock irregularities, as has been described herein. At sampling rates that enable counting of individual ions, in accordance with at least some of the embodiments of the present invention, the physical limits of the binary clocks are approached or reached. Thus, inaccuracies are introduced due, at least in part, to binary clock path irregularities. By using the solution of embodiments of the present invention, transmissions of binary signals are distributed generally evenly among the binary clock paths of the binary clocks of the master clock such that errors due to irregularities statistically cancel each other out. Thus, the corrected spectrum 96 is relatively accurate and generally follows the real or ideal spectrum 75, as shown in the lower portion 81 of the graph 72 of FIG. 8.

On the other hand, without correction, irregularities can cause undesirable delays in the binary clocks that result in extra data acquisition, or more than should be acquired within a first period of time. Thus, for example, data acquired for times corresponding to m/z values in a range 99 are stored in time bins representing m/z values in a range 102. Averaging this data and plotting it by a point 105, for example, gives a much steeper slope and higher magnitudes for the summation of binary signal values acquired in the first period representing first sample or events detected in a plurality of shots, which are transformed and stored in the time bin for the first events. The steeper slope and higher magnitudes are because the effects of the irregularities are repeatedly applied to data stored in the time bins for the m/z values corresponding to the range 102.

Because such irregularities increase the actual time over which data is being acquired during the first period for the first sample or event of each of a plurality of shots, data that would have been detected during a portion of plural second periods and corresponding to second events is reduced. As a result, the data detected during these second periods is summed and stored for a value to be plotted by a point 108, for example, that may be generally centered in the ideal second period. Since the data summed in this respective time bin is reduced, the apparent magnitude is also reduced. This results in the peak fragmentation 87, as shown in the upper portion 78 of the graph 72 of FIG. 8.

By way of additional or alternative explanation, the relative actual periods with delays and the uncorrected pattern of acquisition shown in FIG. 5 may be applied to the sample of FIG. 8. Due to a delay in the binary clock path 1, the extra data represented by hatched area 111 shown in the ideal second period may actually be attributed to data collected during a first period and representing first samples or detected events 1 for a plurality of shots. This extra data 111 together with data that actually falls in the first time period is summed as $\Sigma_1$. The extra data 111 is plotted as the oppositely hatched area 114 in the first period sector on the graph 72 of FIG. 8. In accordance with the logic of this explanation, the hatched area 111 should generally be equal to the oppositely hatched area 114 since the total number or ions detected and counted will be the same whether detected during the first, second, third, or fourth periods. Also, the data representing second detected events 2 of FIG. 5 and a corresponding area under the ideal curve 75 during the rest of the second period is summed as indicated by $\Sigma_2$ of FIG. 8. This summed data $\Sigma_2$ is applied to a full measure of the time lapse that a clock without regularities would have yielded for the second period. As a result, the upper portion 78 of the graph 72 for the second period shows a large drop in magnitude values. Thus, a notch or the fracture 87 is formed in the flawed spectrum 84. Efforts at total area and curve matching for data acquired third and fourth periods representing third and fourth detected events 3, 4 of FIG. 5 are summed as $\Sigma_3$ and $\Sigma_4$ and may result in the values shown for flawed spectrum 84 of FIG. 8.

The peak fracture 87 in this case is the result of a multiplication of the error caused by binary clock path irregularities. The error is multiplied by the number of shots in which samples containing the skewed data is repeatedly sent to one or more of time bins storing the summation of one or more m/z values. Conversely stated, the peak fracture can be avoided by generally evenly distributing transmission of data for each m/z value over a plurality of binary clock paths in the master clock such that errors are statistically cancelled out.

The beneficial improvement in approximation of an ideal spectrum is shown by comparison of the corrected spectrum 96 to each of the solid curve 75 of the ideal spectrum in the lower portion 81 and the flawed spectrum 84 of the upper portion 78 of graph 72. Thus, improved peak integrity is achieved in accordance with embodiments of the present invention.

Figure 9:
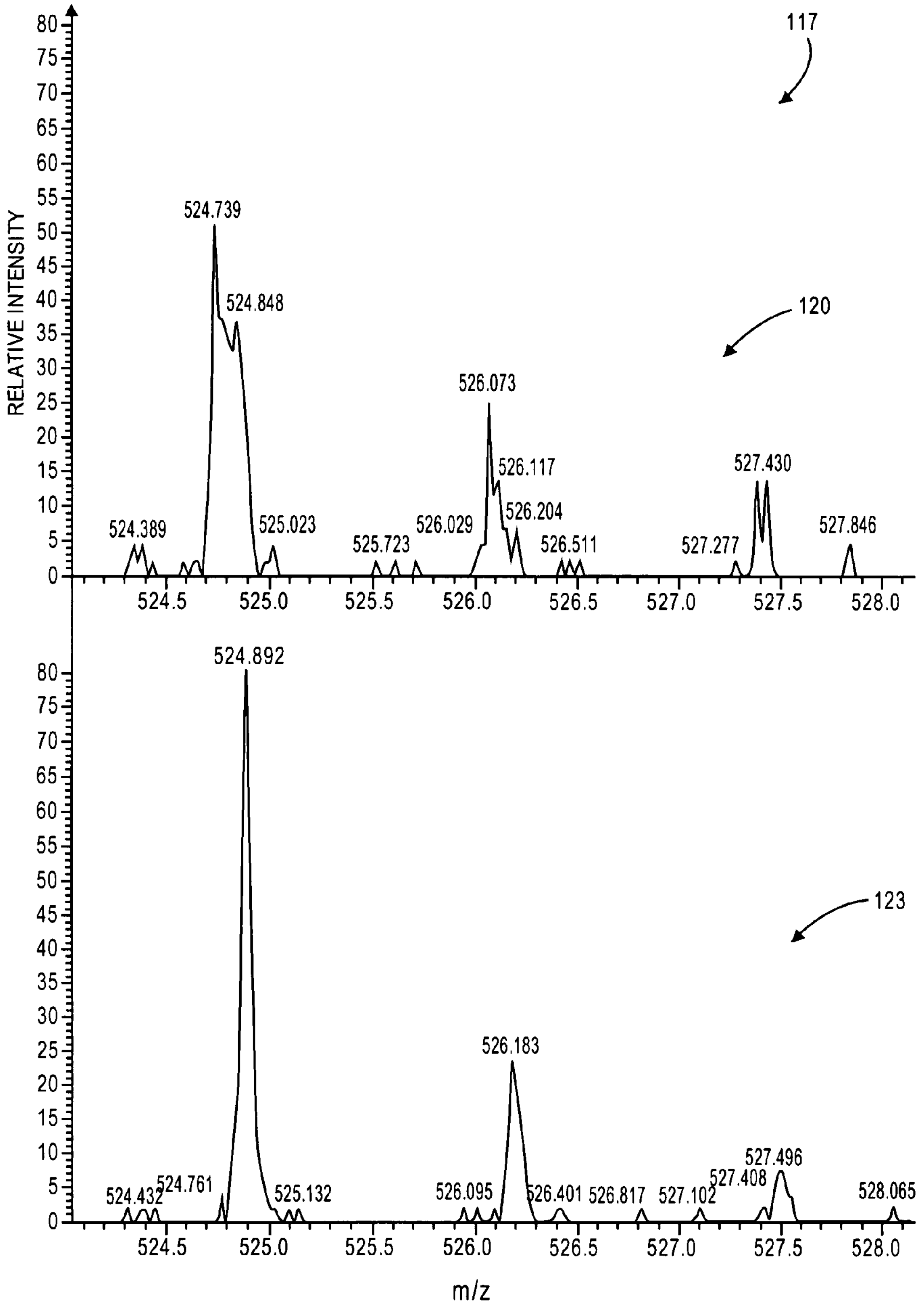
FIG. 9 is a graph taken from analysis of an actual sample showing an actual flawed spectrum without clock phase to time bin cycling as compared with an actual ideal spectrum or a spectrum produced by applying clock phase to time bin cycling for error correction in accordance with embodiments of the present invention.

FIG. 9 is a graph 117 with an upper portion showing a flawed spectrum 120 and a lower portion showing a corrected spectrum 123 in accordance with embodiments of the present invention. The graph 117 and spectrums represent data from actual analyses comparing the results with and without the clock phase to bin cycling described herein. As may be appreciated by a comparison of the flawed and corrected spectrums 120, 123, the flawed spectrum has several fractures making it difficult to determine the actual apex of the peaks.

Although the embodiments of the present invention have been shown and described with regard to simple examples, it is to be understood that the concept can be generalized and applied to more complex systems. For example, greater or lesser numbers of clocks may be used, and different counting schemes may be implemented. Clock paths may include many clocks and any number of binary clock paths and binary signal lines. While a simple example of a spectrum having four evenly spaced peaks with substantially the same magnitude has been used for illustration in one case and a simple example of a single peak spectrum has been used for illustration in another case, the concepts described herein apply to even the most complex spectrums. For example, even if there are four and a half times as many peaks as there are clock paths, it is expected that a pattern of errors will likely be propagated in a spectrum that is generated without the correction of the embodiments of the present invention. The clock phase to time bin cycling or patterning device and/or method of embodiments of the present invention can be applied to statistically cancel out the errors in any detected spectrum that utilizes a plurality of shots and surumation of data from plural samples per shot. This will enable rapid acquisition and relatively high resolution in TOF mass spectrometry while reducing the errors due to clock path irregularities.

While error correction has been described primarily in terms of imposing delays or otherwise controlling a pattern or random distribution of the samples per shot across a plurality of binary clock paths, other techniques for clock path error correction are considered to be within the spirit and scope of the teachings of the present invention. For example, the phases or sampling periods during each shot could be directly adjusted to compensate for the binary errors within the binary clock paths. That is, if a particular path has inherent delays, it could be adjusted to shorten its duration or sampling period. Likewise, any shorter than expected phases could be adjusted or have delays added to provide the desired (for example equal length) sampling periods for each shot.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A time of flight mass spectrometer (TOF) with a clock phase to time bin cycling device, the TOF comprising:

a time of flight analyzer;

an ion source connected to the time of flight analyzer;

an ion detector associated with the time of flight analyzer;

at least one data storage cell for storing data representing a time stamp;

a high speed master clock having a plurality of binary clocks, the binary clocks having respective binary clock paths, wherein a combination of the binary clock paths is for carrying a composite binary signal to be decoded into the time stamp and sent to the at least one data storage cell; and a binary clock signal path selection device that systematically selects the combination of the binary clock signal paths in a pattern that directs data signals representing particular masses generally uniformly along the plurality of binary clock paths;

wherein the clock path selection device comprises a variable delay timer operably connected to one of the ion detector and the ion extractor for adjusting a delay for transporting the data to the at least one data storage cell in a systematic manner such that data for a first peak is delivered via different composite binary signals over a plurality of shots.

2. The TOF of claim 1, wherein the variable delay timer adjusts delays in transporting data to the at least one data storage cell for a plurality of peaks including the first peak such that the data representing a particular peak is transported as a plurality of different composite binary signals such that aberrations in the data caused by irregularities in a particular path are distributed in a spectrum for statistical improvement of the spectrum.

3. A method of reducing errors in a time of flight (TOF) spectrum, the method comprising:

analyzing a plurality of shots of a sample in a time of flight mass spectrometer;

creating a pattern of delays for data signals received from a detector of the time of flight mass spectrometer into a high speed clock;

adding different delays of the pattern of delays to the data signals to vary a combination of binary signals within the high speed clock;

forming a pattern of composite binary signals by combining a plurality of binary signals in the high speed clock for each data signal;

triggering passage of the composite binary signals into a decoder by the high speed clock, wherein the binary signals for a particular peak are made up of a plurality of different ones of the composite binary signals having different combinations of the plurality of binary signals based on a distribution of the pattern of delays;

decoding the composite binary signals to obtain time stamps; and placing the time stamps into data storage cells;

wherein the step of forming a pattern of composite binary signals further comprises combining binary signals from a plurality of binary clock paths within the high speed clock.

4. The method of claim 3, wherein the steps of adding, forming, and triggering also include distributing data with generally uniform frequency along a plurality of binary clock paths such that clock path irregularities generally statistically cancel each other out.

5. The method of claim 3, wherein the steps adding, forming, and triggering further comprise randomizing the binary signals and binary clock paths utilized for representing the composite binary signal for data signals received from the detector.

6. The method of claim 3, wherein the steps of adding, forming, and triggering further comprise delivering the data along a plurality of binary clock paths within the high speed clock in a varying pattern that distributes delivery of the data corresponding to each peak of a plurality of peaks via a plurality of binary clock path combinations corresponding to the composite binary signals such that errors due to irregularities in binary clock paths are statistically reduced.

* * * * *